United States Patent
Kupratis et al.

(10) Patent No.: US 9,523,329 B2
(45) Date of Patent: Dec. 20, 2016

(54) GAS TURBINE ENGINE WITH STREAM DIVERTER

(71) Applicant: UNITED TECHNOLOGIES CORPORATION, Farmington, CT (US)

(72) Inventors: Daniel Bernard Kupratis, Wallingford, CT (US); Francis R. Moon, Granby, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 520 days.

(21) Appl. No.: 13/937,670

(22) Filed: Jul. 9, 2013

(65) Prior Publication Data

US 2014/0260180 A1    Sep. 18, 2014

Related U.S. Application Data

(60) Provisional application No. 61/799,627, filed on Mar. 15, 2013.

(51) Int. Cl.
| | |
|---|---|
| *F02K 3/075* | (2006.01) |
| *F02K 3/077* | (2006.01) |
| *F02C 3/14* | (2006.01) |
| *F02C 9/18* | (2006.01) |
| *F02C 3/13* | (2006.01) |
| *F02K 3/06* | (2006.01) |

(52) U.S. Cl.
CPC ............ *F02K 3/075* (2013.01); *F02C 3/13* (2013.01); *F02C 3/145* (2013.01); *F02C 9/18* (2013.01); *F02K 3/077* (2013.01); *F02K 3/06* (2013.01); *F05D 2210/40* (2013.01); *F05D 2250/311* (2013.01)

(58) Field of Classification Search
CPC .............. F02C 3/145; F02C 9/16; F02C 9/18; F02C 3/13; F05D 2210/40; F05D 2250/311; F02K 3/06
USPC ............................................ 60/226.3
See application file for complete search history.

(56) References Cited

U.S. PATENT DOCUMENTS

| | | | | |
|---|---|---|---|---|
| 2,504,181 A | * | 4/1950 | Contsant ............... | F02K 3/065 60/226.1 |
| 4,064,692 A | * | 12/1977 | Johnson ............... | F02K 3/075 60/262 |
| 5,044,153 A | * | 9/1991 | Mouton ............... | F02C 7/052 415/121.2 |

(Continued)

OTHER PUBLICATIONS

International Search Report and Written Opinion for related International Application No. PCT/US2014/041746; report dated Oct. 2, 2014.

(Continued)

*Primary Examiner* — Gerald L Sung
*Assistant Examiner* — Alain Chau
(74) *Attorney, Agent, or Firm* — Cantor Colburn LLP

(57) ABSTRACT

In accordance with one aspect of the disclosure, a stream diverter for a gas turbine engine is disclosed. The stream diverter may include a first air duct, a second air duct, a third air duct, and a door operatively associated with the second and third air ducts of the gas turbine engine. The door may have at least an open position allowing air from the second air duct to flow into the third air duct and a closed position preventing air from flowing between the ducts.

12 Claims, 3 Drawing Sheets

(56) References Cited

U.S. PATENT DOCUMENTS

| | | | |
|---|---|---|---|
| 5,279,109 A | | 1/1994 | Liu et al. |
| 5,351,473 A | | 10/1994 | Shuba |
| 5,845,482 A | * | 12/1998 | Carscallen ............ F01D 17/105 60/226.3 |
| 5,867,980 A | * | 2/1999 | Bartos ...................... F02K 7/16 60/226.1 |
| 7,216,475 B2 | * | 5/2007 | Johnson .................. F02K 3/065 60/226.1 |
| 8,356,483 B2 | | 1/2013 | Petty et al. |
| 2005/0060983 A1 | | 3/2005 | Lardellier |
| 2011/0167791 A1 | * | 7/2011 | Johnson ................ F01D 17/162 60/226.3 |
| 2013/0025286 A1 | * | 1/2013 | Kupratis ................ F02K 3/065 60/772 |
| 2013/0145769 A1 | * | 6/2013 | Norris .................... F02K 3/105 60/772 |
| 2013/0255224 A1 | * | 10/2013 | Kupratis .................. F02C 6/02 60/226.1 |

OTHER PUBLICATIONS

International Preliminary Report; International Application No. PCTUS2014041746; International Filing Date Jun. 10, 2014; Date of Mailing Jan. 21, 2016; Client Reference No. 63539WO01.

* cited by examiner

GAS TURBINE ENGINE WITH STREAM DIVERTER

STATEMENT OF GOVERNMENT INTEREST

The United States Government has certain rights in this invention pursuant to contract number FA8650-09-D-2923/DO13 between the United States Air Force and United Technologies Corporation.

FIELD OF THE DISCLOSURE

The present disclosure generally relates to gas turbine engines, and more specifically relates to fan nozzles for geared turbofan engines.

BACKGROUND OF THE DISCLOSURE

Gas turbine engines generally have a plurality of axially aligned components including a fan, a compressor section, a combustor, and a turbine section. The fan, positioned at a forward end of the engine, rotates to draw in and accelerate ambient air. Some of the accelerated air flows downstream to the compressor section, as a core flow, where the air is compressed and then flows downstream to the combustor. At the combustor, the compressed air is mixed with fuel and combusted to form an exhaust. The exhaust expands from the combustor through the turbine section, causing turbines of the turbine section to rotate, and then flowing out of the engine at an aft end of the engine. The rotation of the turbines drives the rotation of the fan and compressors by way of a shaft, or a plurality of concentrically mounted shafts in the case of a multi-spool engine. It can therefore be seen that once this process has begun it is self-sustaining.

A reverse core gas turbine engine works differently in that air is pressurized with the fan at the forward end of the engine and transported to the aft end of the engine to the compressor section. From the compressor section, the air flows in a forward direction through the combustor and turbine section. From the turbine section, the air is redirected in an aftward direction to generate thrust. Typically, reverse core engines include three air streams, the core stream described above, a bypass stream that is utilized for only generating thrust, and a middle stream that mixes with the exhaust from the core stream before flowing out of the engine. If the fan pressure ratio between these streams is low, a variable fan intake nozzle may be necessary to control an operating line of the fan, especially between takeoff and cruise.

While effective, the equipment necessary for the variable fan intake nozzle introduces weight and complexity to the fan nozzle. Therefore, a new manner of controlling the fan operating line that does not introduce additional weight and complexity into the fan nozzle is necessary.

SUMMARY OF THE DISCLOSURE

In accordance with one aspect of the disclosure, a stream diverter for a gas turbine engine is disclosed. The stream diverter may include a first air duct, a second air duct, a third air duct, and a door operatively associated with the second and third air ducts of the gas turbine engine. The door may have at least an open position allowing air from the second air duct to flow into the third air duct and a closed position preventing air from flowing between the ducts.

In a refinement, the stream diverter may further include an actuator operatively associated with the door such that the actuator may move the door between at least the open and closed positions.

In another refinement, the stream diverter may further include a plurality of doors. The doors may be arranged circumferentially around the gas turbine where each door overlaps an adjacent door.

In yet another refinement, the stream diverter may further include a hinge mounting the door to the ducts such that the door may swing between at least the open position and the closed position.

In still another refinement, the gas turbine engine may be a reverse core engine. One duct may be a middle duct of the reverse core engine and the other duct may be an outer duct of the reverse core engine.

In accordance with another aspect of the disclosure, a gas turbine engine is disclosed. The engine may include a first air duct communicating air through the gas turbine engine, a second air duct adjacent to the first air duct and communicating air through the gas turbine engine, and a third air duct adjacent to the second air duct and communicating air through the gas turbine engine. The engine may further include a stream diverter positioned between the second air duct and the third air duct. The stream diverter may include a door operatively associated with the ducts such that the door has an open position that allows air from the second air duct to flow into the third air duct and a closed position that prevents mixing of air from the second and third air ducts.

In a refinement, the gas turbine engine may further include a fan, where the stream diverter is positioned immediately downstream of the fan.

In a further refinement, the fan may be a secondary fan of the gas turbine engine.

In another refinement, the stream diverter may be position radially outward from the second air stream.

In yet another refinement, the stream diverter may further include an actuator operatively associated with the door such that the actuator moves the door between at least the open position and the closed position.

In still another refinement, the gas turbine engine may be a reverse core engine, where the second duct may be a middle duct and the third duct may be an outer duct.

In accordance with yet another aspect of the present disclosure, a method of operating a stream diverter in a gas turbine engine is disclosed. The method may include the steps of communicating air through the gas turbine engine with at least two ducts and diverting air from one duct to another duct with a stream diverter positioned between the two ducts by opening a door of the stream diverter.

In a refinement, the door of the stream diverter may be opened during a cruise mode of operation of the gas turbine engine.

In a further refinement, the door of the stream diverter may be fully opened during the cruise mode of operation.

In another refinement, the door of the stream diverter may be only partially opened.

In another refinement, the method may further include restricting the flow of air between the two ducts by closing the door of the stream diverter.

In a further refinement, the door of the stream diverter may be closed during a takeoff mode of operation of the gas turbine engine.

In yet another refinement, the door of the stream diverter may be opened to adjust an air pressure ratio in the two ducts.

In yet another refinement, the door of the stream diverter may be opened to centrifuge debris out of the second duct and into the third duct.

In still another refinement, the gas turbine engine may be a reverse core engine, where one duct may be a middle duct and the other duct may be an outer duct.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
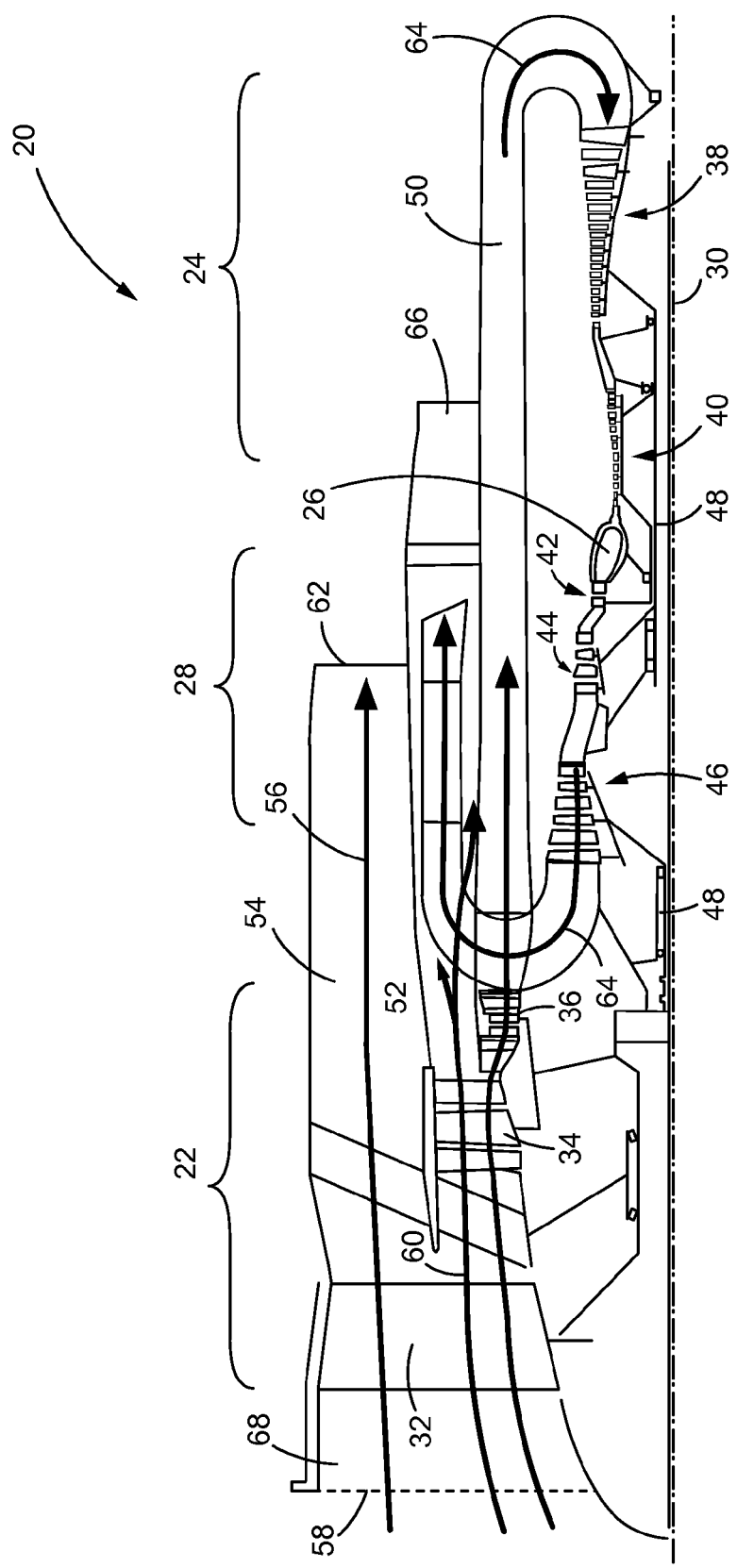
FIG. 1 is a schematic view of a gas turbine engine.

Referring now to the drawings, and with specific reference to FIG. 1, a gas turbine engine 20 is illustrated. Specifically, a reverse core geared turbofan engine is illustrated. However, any engine having multiple intake air streams is envisioned as benefiting from the material disclosed herein.

In downstream sequence, distributed along the engine central longitudinal axis 30, the engine 20 includes a fan section 22, a compressor section 24, a combustor 26, and a turbine section 28. The fan section 22 includes, in a downstream sequence, a first fan 32, a second fan 34, and a third fan 36. The compressor section 24 includes, in a downstream sequence, a low pressure compressor 38 and a high pressure compressor 40. The turbine section 28 includes, in a downstream sequence, a high pressure turbine 42, an intermediate turbine 44, and a low pressure turbine 46. The turbines 42, 44, 46 mechanically drive the compressors 40, 38 and the fan section 22, respectively, via a plurality of engine shafts 48.

As can be seen in FIG. 1 a first duct 50, a second duct 52, a third duct 54, and a fan nozzle 68 communicate air through the engine 20. The fan nozzle 68, positioned at a forward end of the engine 20, accepts air from the atmosphere through a fan nozzle inlet 58 and communicates the air across the first fan 32. The third duct 54, illustrated as a radial outer duct, communicates a bypass stream 56 from the fan nozzle 68 to a bypass air outlet 62. The second duct 52, illustrated as a radial middle duct, receives air from the fan nozzle 68 and communicates that air as a middle stream 60 across the second fan 34 and to a core air outlet 66. The first duct 50, illustrated as a radial inner duct, receives air from the second duct 52 and communicates that air as a core stream 64 across the third fan 36. Thereafter, the air is communicated through the compressor section 24, to the combustor 26, through the turbine section 28, and back into the second duct 52. The air is then mixed with the middle stream 60 and discharged through the core air outlet 66.

Figure 2:
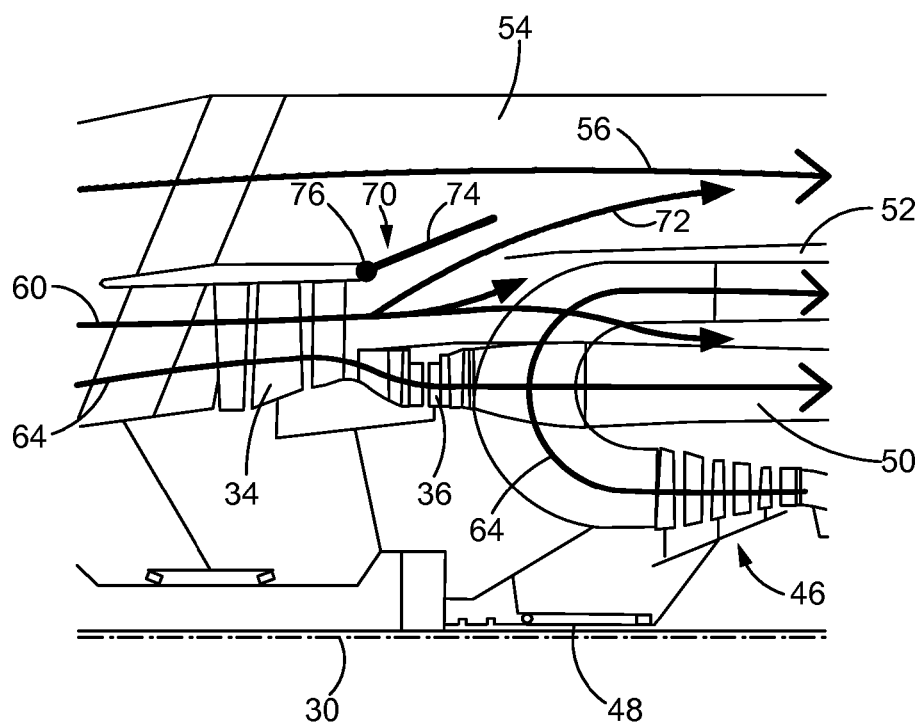
FIG. 2 is a schematic view of a gas turbine engine constructed in accordance with an embodiment of the present disclosure and detailing a stream diverter having a hinged door in an open position.
Figure 3:
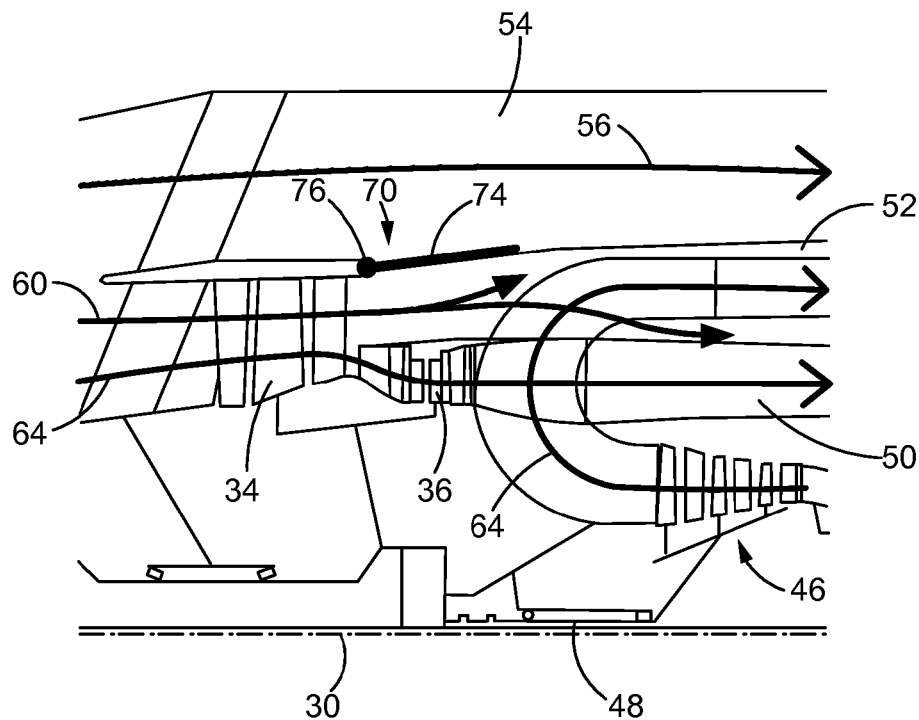
FIG. 3 is a schematic view of a gas turbine engine constructed in accordance with an embodiment of the present disclosure and detailing a stream diverter having a hinged door in a closed position.

The engine 20 includes a stream diverter 70 positioned downstream of the second fan 34, between the second duct 52 and third duct 54, as illustrated in FIGS. 2 and 3. The stream diverter 70 includes a door 74 or other partition that has at least an open position and a closed position. The door 74 is operatively associated with the ducts 52, 54 such that the open position allows a diverted air stream 72 to flow from one duct into the other duct, illustrated from the second duct 52 to the third duct 54. The closed position of the door 74 prevents any mixing of air between the second and third ducts 52, 54. The stream diverter 70 may include a single door 74 or a plurality of doors 74 distributed circumferentially about the engine between the ducts 52 and 54. Each of the doors 74 may overlap an adjacent door such that at the open position and the closed position no air passes between the doors 74.

Figure 4:
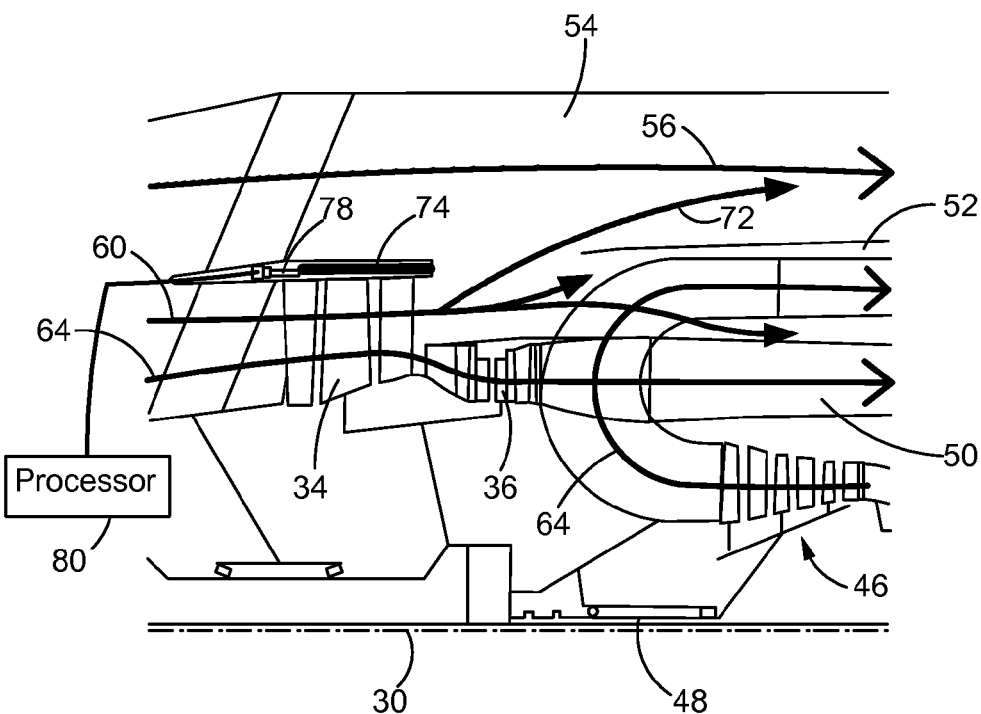
FIG. 4 is a schematic view of a gas turbine engine constructed in accordance with an embodiment of the present disclosure and detailing a stream diverter having a sliding door in an open position.
Figure 5:
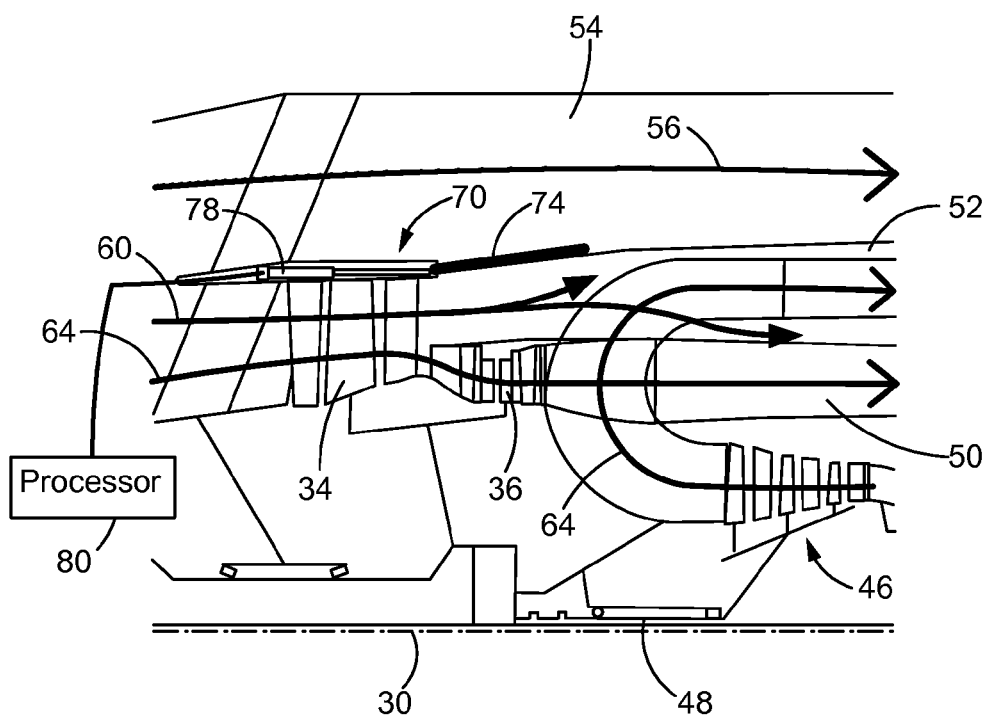
FIG. 5 is a schematic view of a gas turbine engine constructed in accordance with an embodiment of the present disclosure and detailing a stream diverter having a sliding door in a closed position.

As also illustrated in FIGS. 2 and 3, the door 74 is operatively associated with a hinge 76 to allow the door 74 to pivot between at least the open position and the closed position. However, the door 74 moves between an open position and a closed position via other means as well, such as, but not limited to, a roller or a track to allow the door 74 to slide between open and closed positions such as depicted in FIGS. 4 and 5.

While the door 74 has been described as having an open position and a closed position, other positions are also possible. In one example, the door 74 has multiple open positions such that different quantities of air are allowed to flow from the second duct 52 to the third duct 54 at each position. Alternatively, the door 74 is capable of being disposed in a position or positions that allow air to flow from the third duct 54 into the second duct 52.

The door 74 is operatively associated with an actuator 78 that moves the door 74 among the various positions available to the door 74. The actuator 78 is a hydraulic system, as illustrated in FIGS. 4 and 5, or the like, and is controlled by an operator or a processor 80 based on predetermined operating conditions, or as needed. The actuator 78 moves the door 74 to predetermined positions between, and including, a fully open position, that is, a position that allows a relative maximum flow of air between the two ducts 52, 54; and a fully closed position, that is, a position that prevents air from flowing between the ducts 52, 54. Alternatively, the actuator 78 moves the door 74 freely between, and including, the fully open and fully closed positions to a position specified by the operator or processor 80 during operation of the engine 20.

In operation, the operator or processor 80 determines when to open or close the door 74 of the stream diverter 70. For instance, the door 74 is opened to allow any debris that may have entered into the second duct 52 to centrifuge out of the second duct 52 and into the third duct 54. Other situations for opening and closing the door 74 is for, but not be limited to, modulating air pressure ratios between the second and third ducts 52, 54 and controlling a fan operating line. Alternatively, the door 74 is opened during specific operating conditions, such as a cruise mode and a takeoff mode of operation, or as needed to adjust pressure ratios or the fan operating line.

For example, the door 74 is fully opened during the cruise mode of operation as in FIGS. 2 and 4, which sets the operating line during the cruise mode on a fan map of the first fan 32. The fan map of the first fan 32 being a plot of an air pressure ratio in the third duct 54 to air throughput in the third duct 54. Where the air pressure ratio is a ratio of an air pressure of incoming air versus outgoing air. Opening the door 74 maximizes the flow of air through the third duct 54, increases the outgoing air pressure, but does not alter the incoming air pressure and thus sets the operating line left of a typical operating line. In these illustrated examples, the middle stream 60 is pressurized by the fans 32, 34 to a greater pressure than the bypass stream 56, so the diverted air stream 72 flows from the second duct 52 through the stream diverter 70 and into the third duct 54. To accommodate this flow of air, the third duct 54 is sized to pass the sum of the bypass stream 56 and the diverted air stream 72 when the door 74 is fully open. This sets the operating line of the first fan 32 during a cruise mode of operation of the engine 20. This open position of the door 74 reduces air pressure in the second duct 52 and increases air pressure in the third duct 54, both relative to the closed position, by allowing the air in the second duct 52 to flow into the third duct 54.

In a further example, the door 74 is closed during the takeoff mode of operation to increase the air pressure, relative the open position discussed above, in the second duct 52 by prohibiting the flow of air from the second duct 52 to the third duct 54. This causes the first fan 32 to upflow and shifts the operating line of the first fan 32 to the right. While only the fully open and fully closed positions of the door 74 have been described, any other position between 0% and 100% open are also possible.

INDUSTRIAL APPLICABILITY

From the foregoing, it can be seen that the technology disclosed herein has industrial applicability in a variety of settings such as, but not limited to providing variable fan nozzle functions for a gas turbine engine with a fixed fan nozzle. The stream diverter may be shifted between set positions or moved freely by an operator or a processor to modulate the pressure ratio of the air streams of the engine and the operating line of the fan.

While various embodiments are positively recited herein, no single embodiment is intended on limiting the scope of any other embodiment or the scope of the invention. Moreover, while the present disclosure has been made in reference to a gas turbine engine and an aircraft, and specifically to diverting air streams in a reverse core geared turbofan engine, one skilled in the art will understand that the teachings herein can be used in other applications as well such as, but not limited to, providing variable nozzle functions to gas turbine engines that have three intake air streams with a fixed fan nozzle. It is therefore intended that the scope of the invention not be limited by the embodiments presented herein as the best mode for carrying out the invention, but that the invention include all equivalents falling within the spirit and scope of the appended claims as well.

What is claimed is:

1. A stream diverter for a gas turbine engine, comprising:
a first fan for communicating air through said gas turbine engine;
a first air duct;
a second air duct;
a third air duct receiving an airflow from the first fan;
a second fan for communicating an airflow to said second air duct; said pressure of said airflow in said second air duct being greater than the airflow in said third air duct;
a door operatively associated with the second and third air ducts of the gas turbine engine, the door having at least an open position allowing air from the second air duct to flow into the third air duct and a closed position preventing air from flowing between the ducts;
an actuator for moving said door from said open and closed position;
a processor in communication with said actuator for manipulating the position of said door enabling high pressure airflow from said second duct to flow into said third air duct;
a fan map of the first fan being a plot of air pressure ratio in said third duct to air throughput in said third duct where said pressure ratio is the ratio of the air pressure of incoming air from the fan into the third duct versus the air pressure of outgoing air;
said door being manipulated by said processor according to said fan map; and
wherein the gas turbine engine is a reverse core engine, the second duct being a middle duct of the reverse core engine, and the third duct being an outer duct of the reverse core engine.

2. The stream diverter of claim 1, further comprising a plurality of doors, the doors being arranged circumferentially around the gas turbine engine, each door overlapping an adjacent door.

3. A reverse core gas turbine engine, comprising:
a first fan communicating air into a third air duct and a second air duct;
said third duct defining a radial outer duct having a front end for receiving airflow from said fan and a distal end defining a bypass air outlet for communicating a bypass airflow stream through said engine;
a second fan for pressuring airflow from said first fan;
said second air duct defining a radial middle duct having a front end for receiving said pressurized airflow from said second fan and a distal end defining a core air outlet for communicating a middle airflow stream through said engine;
said middle airflow stream being of higher pressure than said bypass airflow stream;
a first air duct having a front end in fluid communication with said second air duct for receiving a portion of said middle airflow defining a core airflow stream and directing said core airflow stream to a combustor and a turbine;
said first air duct having a distal end defining an outlet in fluid communication with said second air duct prior to said core outlet for returning said core airflow stream into said middle airflow stream for being discharged through said core air outlet; and
a stream diverter positioned between the second air duct and the third air duct, the stream diverter comprising a door operatively associated with the second and third ducts such that the door has an open position that allows a portion of said middle airflow stream from the second air duct to flow into the third air duct and intermix said bypass airstream flow with said middle airflow stream being of a higher pressure than said bypass airstream flow and a closed position that prevents mixing of air from the second and third air ducts.

4. The gas turbine engine of claim 3, wherein the stream diverter further comprises an actuator operatively associated with the door such that the actuator moves the door between at least the open position and the closed position; a processor in communication with said actuator for manipulating the position of said door enabling high pressure airflow from said second duct to flow into said third air duct; and a fan map of the first fan being a plot of air pressure ratio in said third duct to air throughput in said third duct where said pressure ratio is the ratio of the air pressure of incoming air from the fan into the third duct versus the air pressure of outgoing air; said door being manipulated by said processor according to said fan map.

5. A method of operating a stream diverter in a gas turbine engine, comprising:
providing a processor;
communicating air from a fan through the gas turbine engine with at least a first and second duct; and diverting air from the first duct to the second duct with a stream diverter positioned between the first and second ducts by opening a door of the stream diverter;
providing a fan map of said fan, said fan map being a plot of air pressure ratio in said first duct to air throughput in said first duct where said pressure ratio is the ratio of the air pressure of incoming air from said fan into the first duct versus the air pressure of outgoing air;
said door being manipulated by said processor according to said fan map; and
wherein the gas turbine engine is a reverse core engine, the first duct being a middle duct, and the second duct being an outer duct.

6. The method of claim 5, wherein the door of the stream diverter is opened during a cruise mode of operation of the gas turbine engine.

7. The method of claim 6, wherein the door of the stream diverter is fully opened during the cruise mode of operation.

8. The method of claim 5, wherein the door of the stream diverter is only partially opened.

9. The method of claim 5, further comprising restricting the flow of air between the two ducts by closing the door of the stream diverter.

10. The method of claim 9, wherein the door of the stream diverter is closed during a takeoff mode of operation of the gas turbine engine.

11. The method of claim 5, wherein the door of the stream diverter is opened to adjust an air pressure ratio of the two ducts.

12. The method of claim 5, wherein the door of the stream diverter is opened to centrifuge debris out of the first duct and into the second duct.

* * * * *